United States Patent
Raszkowski

[19]
[11] Patent Number: 6,116,809
[45] Date of Patent: Sep. 12, 2000

[54] ROTATING ASSEMBLY WITH INTERNAL RETAINING RING

[75] Inventor: James Allen Raszkowski, Indianapolis, Ind.

[73] Assignee: General Motors Corporation, Detroit, Mich.

[21] Appl. No.: 09/140,046

[22] Filed: Aug. 26, 1998

[51] Int. Cl.[7] .................................................. F16D 1/00
[52] U.S. Cl. .......................... 403/319; 403/316; 403/326; 403/359.5; 403/375; 74/438
[58] Field of Search .................... 403/319, 316, 403/318, 359.1, 359.5, 359.4, 328, 326, 359.2, 359.3, 359.6, 154, 155, 289, 290, 375; 74/438

[56] References Cited

U.S. PATENT DOCUMENTS

| | | | |
|---|---|---|---|
| 1,490,649 | 4/1924 | Vanderbeek | 403/359.5 |
| 2,650,484 | 9/1953 | Bujak | 403/359.4 |
| 3,290,071 | 12/1966 | Kusiak | 403/316 |
| 3,517,953 | 6/1970 | Wright et al. | 403/359.3 |
| 3,535,977 | 10/1970 | Baumgarten | 403/326 |
| 3,608,936 | 9/1971 | Karden | 403/359.5 |
| 3,750,424 | 8/1973 | Nettleton | 403/359.4 |
| 3,909,920 | 10/1975 | Cornish et al. | 403/326 |
| 4,113,397 | 9/1978 | Snyder | 403/154 |
| 4,405,251 | 9/1983 | Kolchinsky et al. | 403/326 |
| 4,752,178 | 6/1988 | Greenhill | 403/326 |
| 5,234,278 | 8/1993 | Hall, III et al. | 403/359.5 |
| 5,788,399 | 8/1998 | Smearsoll | 403/319 |

FOREIGN PATENT DOCUMENTS 673776  7/1979  Russian Federation ............ 403/359.6

*Primary Examiner*—Lynne H. Browne
*Assistant Examiner*—Danielle Somrak
*Attorney, Agent, or Firm*—Laura C. Wideman

[57] ABSTRACT

An outer member and an inner member are drivingly connected at a toothed interface. The members are restrained from axial separation by a retaining ring. The retaining ring is engaged in a groove formed in the inner member and has a pair of tabs which extend radially outward through slots in the inner member. The tabs abut an end face on the outer member thereby preventing relative axial displacement of the inner and outer members.

3 Claims, 2 Drawing Sheets

ROTATING ASSEMBLY WITH INTERNAL RETAINING RING

TECHNICAL FIELD

This invention relates to rotatable assemblies having retaining rings for securing two members in axial alignment.

BACKGROUND OF THE INVENTION

When two or more components are assembled into a single unit, a retaining structure is needed to prevent separation especially when the assembled components are in a rotating device such as a transmission. A common retention device for such assemblies is a retaining ring that engages in a groove formed in the radially outer member of the assembly. This method of assembly requires sufficient axial space to accommodate the groove portion of the outer member. Thus the assembly length is increased in the range of ¼ to ½ of an inch due to the presence of the retaining ring.

When the retaining ring is disposed in a groove formed in the inner member, the centrifugal forces associated with large rotating bodies can cause the ring to disengage the groove. With such assemblies, special locking members are installed at assembly, thereby adding to the cost and assembly time.

Other assembly methods, such as welding or brazing, have also been used. These methods generally add cost and increased handling time for the assembly and also make the disassembly thereof difficult. Press fit and staking operations have been used also. These operations generally require tighter machining tolerances and pressing equipment to achieve the final assembly.

SUMMARY OF THE INVENTION

It is an object of the present invention to provide an improved assembly with a retaining ring.

In one aspect of the invention, an inner member of an assembly has a groove in which a retaining ring is engaged.

In another aspect of the present invention, the retaining ring has a plurality of tab portions extending radially outward from a main body of the ring and passing through slots communicating the groove to the outer periphery of the inner member.

In yet another aspect of the present invention, an outer member of the assembly has an end face formed thereon and disposed to abut said tabs of the retaining ring to prevent inadvertent separation of the inner and outer members in one axial direction.

DESCRIPTION OF THE PREFERRED EMBODIMENT

Figure 1:
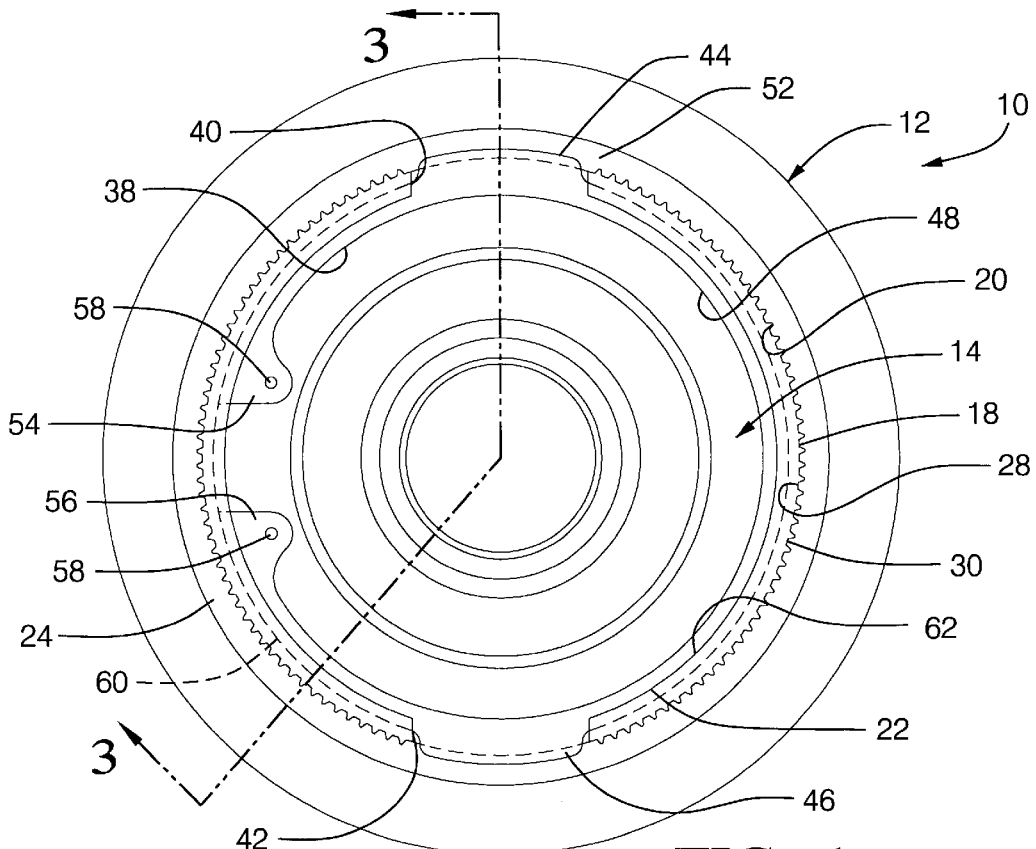
FIG. 1 is an end view of an assembly incorporating the present invention.

As seen in the drawing, an assembly 10 has an outer member 12 and an inner member 14. The inner member 14 has a hub portion 16 which secures the member 14 to a transmission component such as a housing, not shown. The inner member 14 has an outer periphery 18 in which spline teeth 20 are formed. A lip or rim extension 22 is formed on an end face 24 of the inner member 14. A ring retaining groove 26 is machined into the lip 22.

The outer member 12 has an inner periphery 28 in which spline teeth 30 are formed. The spline teeth 30 are in dental engagement with the spline teeth 20 to ensure conjoint rotation of the inner member 14 and the outer member 12. The spline teeth 20, 30 can have a mild press fit if desired, however the press fit does not ensure that the inner and outer members 14, 12 will remain in axial registration. The outer member 12 is preferably a component of a hydrodynamic brake or retarder commonly used with heavy duty transmissions in large trucks and earth moving equipment. The outer member has a plurality of vanes 32 which are adapted to react with fluid when it is desired to retard motion of the vehicle in which the retarder is assembled. These devices are well-known to those in the transmission art, such that a more complete description is not considered relevant at this juncture.

A shoulder 34 is cast or otherwise machined into the hub 16 and provides a locating surface for an end face 36 on the member 12. The shoulder 34 and end face 36 limit the relative axial movement between the members in one direction. At assembly, the outer member 12 is installed on the inner member 14 until contact is made between the shoulder 34 and the end face 36. Thus, the member 12 cannot move rightward relative to member 14 and the member 14 cannot move leftward relative to the member 12. Since the member 14 is usually secured to a stationary member or located axially by bearing members within the transmission, axial movement of the member 14 is unlikely.

Figure 3:
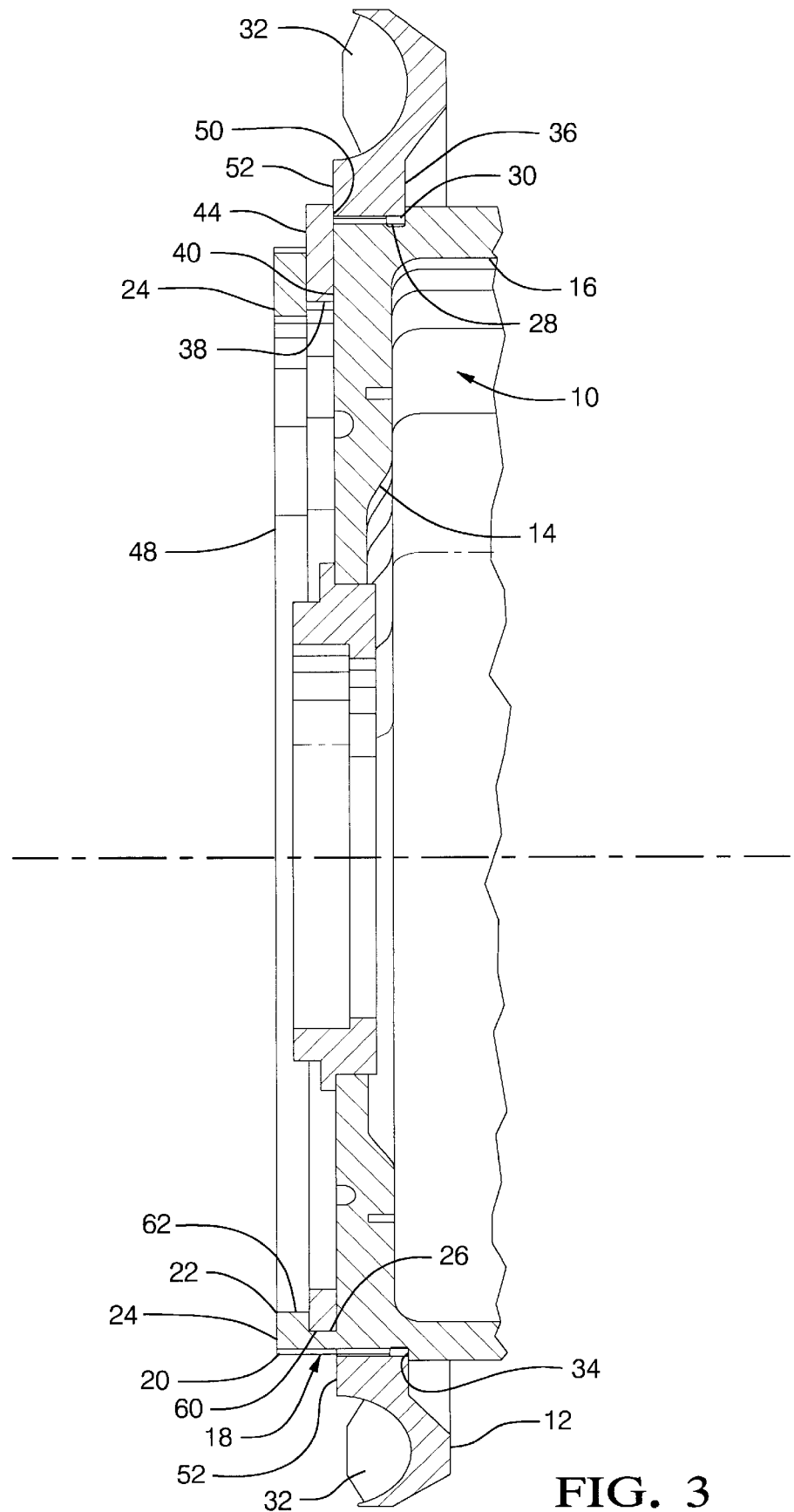
FIG. 3 is a view of the assembly taken along line 3—3 in FIG. 1

A retaining ring 38 is provided to limit the leftward axial movement of the outer member 12 as viewed in FIG. 3. The retaining ring 38 is disposed in the groove 26. Two slots 40, 42 are formed in the lip 22 to communicate the retaining groove 26 with the outer periphery 18. The retaining ring 38 has two tab extensions 44, 46 extending radially outward, from a main body 48 of the ring 38, beyond the outer periphery 18 and the inner periphery 28. The tabs 44, 46 each have a side face 50 which are disposed to abut an end face 52 on the member 12. The retaining ring 38 cooperates with the groove 26 and the end face 52 to limit leftward movement of the member 12 relative to the member 14. It should also be appreciated that the groove 26 prevents any centrifugal forces imposed during rotation from disengaging the ring 38 from the assembly 10.

Figure 2:
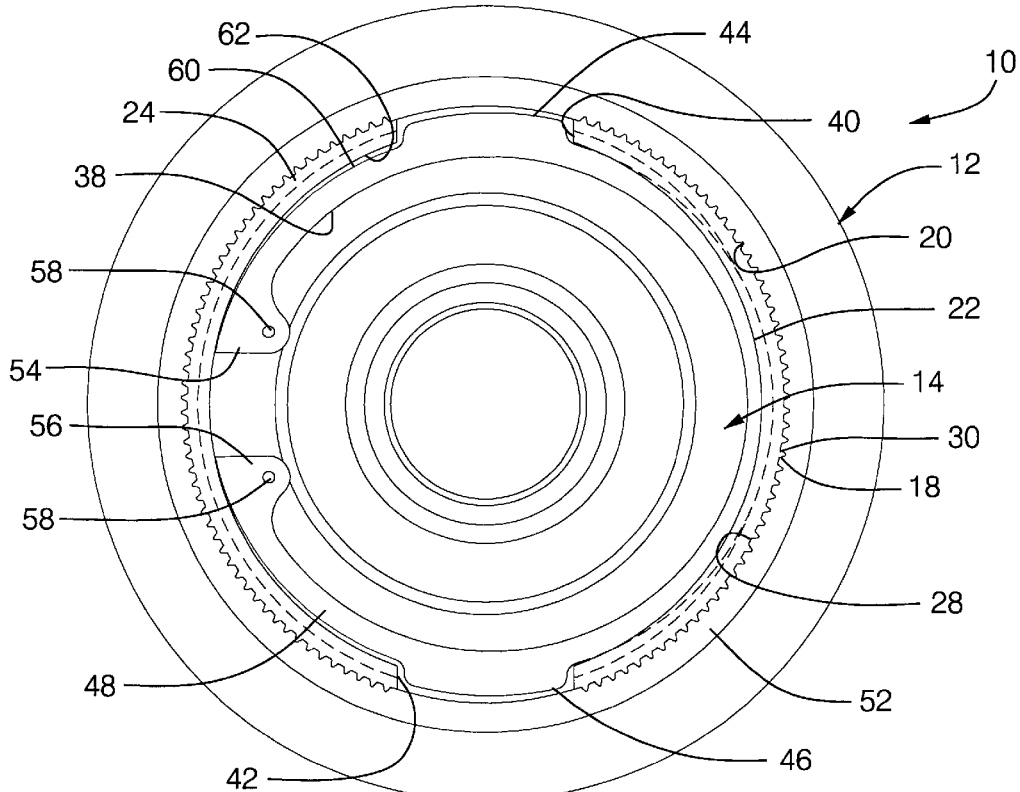
FIG. 2 is an end view of the assembly in FIG. 1 with the retaining ring partially installed.

The retaining ring 38 has lobe portions 54, 56 defining the ends of the main body 48. Each lobe portion 54, 56 has an aperture or opening 58 which is provided to permit a conventional tool, not shown, to compress the ring 38 such that it can be installed as shown in FIG. 2.

The ring 38 is preferably made of spring steel which will readily accept the compression performed by the tool. When the ring is compressed, an outer diameter 60 is sufficiently reduced to permit the ring to be inserted through an inner circumferential portion 62 of the rim 22 and into the groove 26. During assembly the tabs 44, 46 are aligned with the slots 40, 42, respectively. When the tool releases the ring 38, it will expand radially into the groove 26 such that the tabs extend radially outward sufficiently to overlap a portion of the end face 52 thereby securing the inner and outer members 14, 12 as an assembly.

By providing the outer member 12 with a shorter axial dimension than the inner member 14, rotational registration of the members 12, 14 is not required at assembly. If rotational registration is desired, the end face 52 can have a recess formed therein, such that the slots 40, 42 would need to be aligned with such recesses prior to assembling the members 12, 14 so that the tabs 44, 46 would engage in the recesses. The recesses could be milled into the inner periphery as blind recesses if desired. The ring 38 can be removed to permit disassembly by simply using the same tool to compress the ring 38 radially until the outer diameter 60 clears the inner circumferential portion 62.

What is claimed is:

1. A rotatable assembly comprising:

an inner member having an outer toothed periphery, a radially inwardly opening ring groove and a pair of diametrically opposed slots formed from said groove and opening radially through to said toothed outer periphery;

an outer member having an inner toothed periphery in dental engagement with said outer toothed periphery and an end face formed on said outer member; and a split retaining ring having a substantially annular body disposed in said ring groove and a pair of tabs respectively extending through said slots and abutting said end face.

2. The rotatable assembly defined in claim 1 wherein said inner member has an axial extension protruding beyond said end face of said outer member and said groove is formed in said axial extension.

3. The rotatable assembly defined in claim 1 further comprising:

a shoulder formed on said inner member adjacent said toothed outer periphery and said outer member having another face engaged with said shoulder wherein said shoulder limits movement of said outer member in one axial direction and said tabs limit movement of said outer member in another axial direction.

* * * * *